United States Patent [19]

Sugawara et al.

[11] Patent Number: 5,489,643
[45] Date of Patent: Feb. 6, 1996

[54] COATING COMPOSITIONS

[75] Inventors: Eiichi Sugawara, Kawaguchi; Setsuo Hirose, Yoshikawa; Yoshinori Konno, Urawa; Masatoshi Nakajima, Kawaguchi; Toshiaki Higuchi, Kasukabe, all of Japan

[73] Assignees: Dainichiseika Color & Chemicals Mfg. Co., Ltd.; Ukima Coulor & Chemicals Mfg. Co., Ltd., both of Tokyo, Japan

[21] Appl. No.: 214,277

[22] Filed: Mar. 17, 1994

[51] Int. Cl.$^6$ .............. C08K 5/21; C08K 5/02; B32B 27/00; B32B 27/40
[52] U.S. Cl. .......... 524/590; 524/495; 524/496; 524/507; 524/568; 427/130; 427/131; 428/422; 428/694; 428/900
[58] Field of Search .................. 524/496, 495, 524/568, 590, 507; 427/130, 131; 428/694, 900, 422

[56] References Cited

U.S. PATENT DOCUMENTS

| 4,735,985 | 4/1988 | Oien | 524/507 |
| 5,330,784 | 7/1994 | Bobrich et al. | 427/131 |

Primary Examiner—Paul R. Michl
Assistant Examiner—Olga Asinovsky
Attorney, Agent, or Firm—Oblon, Spivak, McClelland, Maier & Neustadt

[57] ABSTRACT

Described is a coating composition for the formation of a back coat layer in a magnetic recording medium, which comprises carbon black, a binder and a solvent. The binder is composed of an acrylic-polymer-modified polyurethane resin and a vinyl chloride copolymer having at least one type of terminal groups selected from hydroxyl groups, carboxyl groups or tertiary amino groups.

6 Claims, No Drawings

COATING COMPOSITIONS

BACKGROUND OF THE INVENTION

1. Field of the Invention

This invention relates to coating compositions for the formation of a back coat layer in a magnetic recording medium. More specifically, this invention relates to magnetic recording mediums excellent in antistatic properties, anti-irregular winding ability, abrasion resistance, running stability and the like and having lower dynamic friction.

2. Description of the Related Art

Magnetic recording mediums such as magnetic tapes have heretofore been used widely. They are required to have a high recording density. In addition, they are required to have excellent antistatic properties, anti-irregular winding properties, abrasion resistance, running stabilizing ability and like properties and have lower dynamic friction upon both production and use, because they are supplied in a rolled form but in use, they are brought into contact at magnetic layers thereof with a magnetic head and at back sides thereof with parts of a tape drive mechanism while being caused to run at a high speed. It is known that to meet such requirements, a back coat layer with fillers, including carbon black, dispersed and bound in and by a binder is provided on the back side of a non-magnetic base film, thereby providing a magnetic recording medium with improved antistatic properties and abrasion resistance.

The following methods have been proposed for the formation of such a back coat layer as described above.

(1) To use carbon blacks of different particle sizes in combination [Japanese Patent Application Laid-Open (Kokai) No. SHO 59-14127].

(2) To provide a back coat layer with a lubricant layer composed of an organometallic compound [Japanese Patent Application Laid-Open (Kokai) No. HEI 2-214015].

(3) To use a polyurethane resin containing tertiary amino groups in its molecule as a binder for a back coat layer [Japanese Patent Application Laid-Open (Kokai) No. HEI 1-92317].

Representative properties which are required for such back coat layers are to improve the antistatic properties, abrasion resistance and lubricity and also to reduce the dynamic friction coefficient.

To impart such properties to a back coat layer, it is principally required to stabilize the dispersion of carbon black in a coating composition, to provide the back coat layer with stabilized gloss and also to provide the back coat layer with high adhesion to a non-magnetic base film. The prior art however failed to sufficiently meet the principal requirements.

Addition of a polyisocyanate curing agent to a coating composition for further improvement of physical properties of the resulting back coat layer as a film and its adhesion to a non-magnetic base film deteriorates the dispersion stability of carbon black in the back coat layer and also the gloss of the back coat layer. The back coat layer with inferior gloss has a rough surface and is therefore accompanied by the problem of inferior abrasion resistance.

SUMMARY OF THE INVENTION

An object of the present invention is therefore to provide a magnetic recording medium having a back coat layer which is excellent in antistatic properties, anti-irregular winding ability, abrasion resistance and running stabilizing ability and has lower dynamic friction.

The above object has been attained by the present invention which will be described hereinafter. Namely, the present invention provides a coating composition for the formation of a back coat, which comprises carbon black, a binder and a solvent. The binder is composed of an acrylic-polymer-modified polyurethane resin and a vinyl chloride copolymer having at least one hydroxyl, carboxyl or tertiary amino terminal group.

According to the present invention, the employment of the acrylic-polymer-modified polyurethane resin and the vinyl chloride copolymer—both as binders for the back coat layer to be formed on a back side of a non-magnetic base film—has made it possible, owing to the very good compatibility between these resins, to stabilize the dispersion of carbon black in the back coat layer and at the same time, to retain a long pot life even if a polyisocyanate is added as a curing agent. Further, the resulting back coat layer is substantially free from decreasing gloss.

The present invention has therefore made it possible to provide a magnetic recording medium having excellent antistatic properties, anti-irregular winding ability, abrasion resistance and running stability and lower dynamic friction.

DETAILED DESCRIPTION OF THE INVENTION AND PREFERRED EMBODIMENTS

The present invention will hereinafter be described more specifically by preferred embodiments of the present invention.

Properties required especially for a back coat layer in a magnetic recording medium include a long pot-life, excellent dispersion stability of carbon black, excellent adhesion to a non-magnetic base film, electric resistance on the order of $1.0 \times 10^5$ $\Omega$ for the prevention of static electrification, excellent abrasion resistance and high gloss.

It is known to add a polyisocyanate crosslinker to a coating composition for a back coat layer for the purpose of improving the above-described properties of the back coat layer, such as abrasion resistance, dynamic friction coefficient and adhesion to a base film. Although this method is very effective, a reaction between a binder and the polyisocyanate crosslinker proceeds in the coating composition with the passage of time so that the binder becomes greater in molecular weight and therefore lower in solubility in solvent. As a result, the dispersion stability of carbon black contained in the coating composition deteriorates in a considerably short time and the back coat layer becomes irregular in gloss (resulting in gradual loss of the gloss).

Accordingly, it is very important for a back coat layer coating composition to have improved properties and also to retain stability for a long time by adding a polyisocyanate crosslinker. The adhesion of the back coat layer to a non-magnetic base film (typically, a polyester film) is an important property of the back coat layer, that is, to keep the resulting magnetic recording medium durable.

Carbon black is employed to ensure the antistatic properties of the back coat layer. It is preferred to use carbon black at a weight ratio of from 40–60 to 60–40 relative to the binder for the back coat layer.

Use of carbon black at a weight ratio higher than the upper limit of the above range will result in a back coat layer with reduced strength and deteriorated adhesion to a nonmagnetic base film, although the back coat layer will be provided with improved antistatic effects. To be useful as a binder for such a back coat layer, the binder is desired to have carbon-black-dispersing ability sufficient to ensure the provision of an electric resistance of the above-described antistatic level when used at a weight ratio of about 1:1 relative to carbon black.

As the binder for the formation of the back coat layer, following resins are employed in combination in the present invention:

(a) an acrylic-polymer-modified polyurethane resin, and (b) a vinyl chloride copolymer containing one type of terminal functional groups selected from hydroxyl, carboxyl or tertiary amino groups or two or more types of terminal functional groups selected from such terminal groups.

The preferred mixing ratio of the component (a) to the component (b) ranges from 5/95 to 50/50. If the component (b) is used in an amount to give a ratio smaller than the above range, the resulting back coat layer will be dissatisfactory in that it will show significantly deteriorated abrasion resistance. If the component (b) is used in an amount to give a ratio greater than the above range, on the other hand, the resulting back coat layer will also be dissatisfactory in that it will have inferior adhesion to the base film (polyester).

The weight ratio of the above-described binder mixture to carbon black preferably ranges from 60/40 to 40/60. Further, it is preferable that the coating composition containing these components has a solid content of about 10–20 wt. %, said solid content being the sum of the contents of the binder and carbon black, and a viscosity of 5–300 cps at 25° C. Examples of a solvent usable in the coating composition include industrial organic solvents employed widely in the industry, such as MEK, MIBK, toluene, xylene, ethyl acetate and mixtures thereof.

In addition, optional additives such as pigment dispersants, nitrocellulose, antioxidants, heat stabilizers and light stabilizer can be added as needed.

To the coating composition of the present invention, a polyisocyanate crosslinker can be added as needed. Examples of the polyisocyanate crosslinker include:

a) "Colonate L" (trade name; product of Nippon Polyurethane Industry Co., Ltd.), b) "Colonate HL" (trade name; product of Nippon Polyurethane Industry Co., Ltd.), c) "Duranate 24A-75" (trade name; product of Asahi Chemical Industry Co., Ltd.), d) "Takenate D-110N" (trade name; product of Takeda Chemical Industries, Ltd.) and e) "Takenate D-140N" (trade name; product of Takeda Chemical Industries, Ltd.).

Each of the binders employed in the above coating composition preferably has a strength at break of 400–700 Kg/cm$^2$ and an elongation at break of 5–20%. In particular, use of a binder having an elongation at break greater than 30% is not preferred even if its strength at break falls within the range of 400–700 Kg/cm2, because the resulting back coat layer is inferior in abrasion resistance.

As a preferred example of application of a coating composition for the formation of a back coat layer, MEK and toluene are combined at a weight ratio of 6:4 as a solvent for the coating composition and the solid content and viscosity of the coating composition are set at 15 wt. % and 5–100 cps at 25° C., respectively. Using a 100-mesh gravure coating roll, the resulting coating composition is applied on a non-magnetic base film at room temperature (20°–30° C.) and a relative humidity of 30–80%. Immediately after the application, the film is dried in hot air at 60°–70° C., whereby a desired back coat layer is formed. By observing the quality of the film so formed, the coating applicability of the coating composition can be judged.

Owing to good compatibility among the acrylic-polymer-modified polyurethane resin, the vinyl chloride copolymer and as a crosslinker, the polyisocyanate compound, the coating composition has superior coating applicability and is practically free from troubles such as "brushing".

The term "acrylic-polymer-modified polyurethane resin" as used herein means a polyurethane resin which as disclosed in Polymer Bulletin 8, 239–244(1982), can be obtained by using a terminal OH-containing macromonomer as at least a part of the hydroxyl component.

Illustrative polymerizable monomer usable for obtaining terminal OH-containing macromonomers include acrylic esters, methacrylic esters, diethylaminoethyl methacrylate, dimethylaminopropyl acrylamide, N,N-dimethylacrylamide, acryloylmorphone, acrylic acid, methacrylic acid, acrylonitrile, styrene, maleic acid, vinyl chloride and vinyl acetate.

Illustrative polyol compounds which can be used together with such terminal OH-containing macromonomers upon synthesis of acrylic-polymer-modified polyurethane resins usable in the present invention include terminal OH-containing bifunctional polyols having a molecular weight of about 700–6,000, such as:

(1) polyether polyols, for example, polyethylene glycol, polyoxypropylene glycol, polytetramethylene glycol and EO/PO copolymer;

(2) lactone polyols, for example, valerolactone polyol and polycaprolactone polyol; and (3) polyester polyols, for example, polyester polyols obtained from diols and dibasic acids.

Examples of such dibasic acids include aromatic dicarboxylic acids such as terephthalic acid, isophthalic acid, orthophthalic acid, trimellitic acid, trimesic acid and pyromellitic acid, acid anhydrides thereof, lower alcohol esters thereof, aromatic hydroxycarboxylic acids and p-hydroxybenzoic acid; and aliphatic dicarboxylic acids such as maleic acid, maleic anhydride, fumaric acid, itaconic acid, adipic acid, azelaic acid, sebacic acid, dodecandicarboxylic acid and dimer acids.

Examples of such diol compounds include ethylene glycol, propylene glycol, neopentyl glycol, diethylene glycol, dipropylene glycol, 1,3-propanediol, 1,4-butanediol, 1,5-pentanediol, 1,6-hexanediol, 2,2,4-trimethyl-1,3-pentanediol, 1,4-cyclohexanedimethanol, dimer diols, ethylene oxide adducts with bisphenol A, propylene oxide adducts with bisphenol A, ethylene oxide adducts with hydrogenated bisphenol A, propylene oxide adducts with hydrogenated bisphenol A and polycarbonate polyols.

Exemplary diisocyanate compounds include aromatic diisocyanate compounds such as TDI, MDI and TMXDI; alicyclic diisocyanate compounds such as IPDI, hydrogenated MDI and norbornene diisocyanate; and aliphatic diisocyanate compounds such as hexamethylene diisocyanate and the dimer thereof.

Illustrative of chain extenders (diol compounds) include ethylene glycol, propylene glycol, neopentyl glycol, diethylene glycol, dipropylene glycol, 1,3-propanediol, 1,4-butanediol, 1,5-pentanediol, 1,6-hexanediol, 2,2,4-trimethyl-1,3-pentanediol, 1,4-cyclohexanedimethanol and N-alkyldiethanolamines.

The vinyl chloride copolymer, which is one of the binders for the coating composition of the present invention, is a copolymer between vinyl chloride and a monomer copolymerizable therewith such as vinyl acetate, acrylonitrile, vinylidene chloride, methyl acrylate, methyl methacrylate, styrene, ethylene, propylene or glycidyl methacrylate.

Examples of the copolymer include vinyl chloride-vinyl acetate copolymer, hydroxyl-containing vinyl chloride-vinyl acetate-vinyl alcohol copolymer, hydroxyl-containing vinyl chloride-vinyl acetate-alkyl acrylate copolymers, vinyl chloride-vinyl acetate-maleic acid copolymer, vinyl chloride-vinyl acetate-propionic acid copolymer, hydroxyl-containing vinyl chloride-vinyl acetate copolymers, and alkali-metal-sulfonate- and hydroxyl-containing vinyl chloride-vinyl acetate-alkylacrylate copolymer.

The binder used in this invention may be added, to an extent not impairing the achievement of the objects of this invention, with a vinyl polymer or copolymer such as acrylic (methacrylic) ester copolymer, acrylonitrile polymer, vinyl chloride-acrylonitrile copolymer, styrene-acrylic (methacrylic) ester copolymer, butadiene copolymer, vinylidene copolymer or fluorine compound copolymer. Furthermore, an aldehyde resin such as phenol resin, epoxy resin, melamine resin or urea resin; silicone resin, nitrocellulose resin and/or cellulose acetate butyrate resin can also be added.

The present invention will hereinafter be described more specifically by the following Referential Examples, Comparative Examples and Examples.

REFERENTIAL EXAMPLE 1

Synthesis of Acrylic-Polymer-Modified Polyurethane Resin without using any Chain Extender

| Formulation | |
|---|---|
| Polycaprolactone polyol (hydroxyl value: about 56, molecular weight: about 2,000, bifunctional polyol) | 500 g |
| Terminal OH-containing polymethyl methacrylate (hydroxyl value: about 30, molecular weight: about 3,733, bifunctional polyol) | 500 g |
| MDI (NCO/OH ≈ 1) | 95.8 g |
| Dibutyltin laurate (catalyst) | 0.1 g |
| MEK (solvent) | 2,800 g |
| Toluene (solvent) | 853 g |

In a 10-l reactor for a polyurethane resin, the polycaprolactone polyol and the terminal OH-containing polymethyl methacrylate macromonomer were changed in the corresponding amounts shown in the above formulation together with 180.0 g of MDI and 300 g of MEK, followed by heating from room temperature (about 25° C.) to about 90° C. over one hour. At the temperature so raised, the contents were reacted for about one hour. To the reaction mixture, 300 g of MEK and 10.0 g of MDI were added, and the reaction was allowed to proceed further for about one hour. To the reaction mixture, the catalyst was added in toto, the remaining MDI in the amount of 16 g was added dropwise, 300 g of MEK were then added while watching the degree of thickening of the reaction mixture. The reaction was allowed to proceed further for about 2 hours. The remaining MEK and toluene were added in toto to the reaction mixture and the resultant mixture was allowed to cool down to room temperature, whereby the target acrylic-polymer-modified polyurethane resin was obtained in the form of a solution.

The resin solution so obtained had a solid content of about 30% and a viscosity of about 300 poises at 25° C.

REFERENTIAL EXAMPLE 2

Synthesis of Acrylic-Polymer-Modified Polyurethane Resin using a Diol Compound as a Chain Extender

| Formulation | |
|---|---|
| Polycarbonate polyol (hydroxyl value: about 56, molecular weight: about 2,000, bifunctional polyol) | 500 g |
| Terminal OH-containing polymethyl methacrylate (hydroxyl value: about 30, molecular weight: about 3,733, bifunctional polyol) | 500 g |
| 1,3-Butanediol (chain extender) | 8 g |
| MDI (NCO/OH ≈ 1) | 118 g |
| Dibutyltin laurate (catalyst) | 0.1 g |
| MEK (solvent) | 2,101.8 g |
| Toluene (solvent) | 525.5 g |

Synthesis was conducted under the same conditions as in Referential Example 1. The resin solution so obtained had a solid content of about 30% and a viscosity of about 500 poises at 25° C.

REFERENTIAL EXAMPLE 3

Synthesis of Acrylic-Polymer-Modified Polyurethane Resin using a Polyester Polyol Compound

| Formulation | |
|---|---|
| Neopentyl glycol-ethylene glycol-isophthalate polyol (hydroxyl value: about 56, molecular weight: about 2,000, bifunctional polyol) | 500 g |
| Terminal OH-containing polymethyl methacrylate (hydroxyl value: about 30, molecular weight: about 3,733, bifunctional polyol) | 500 g |
| MDI (NCO/OH ≈ 1) | 95.8 g |
| Dibutyltin laurate (catalyst) | 0.1 g |
| MEK (solvent) | 2,800 g |
| Toluene (solvent) | 853 g |

Synthesis was conducted under the same conditions as in Referential Example 1. The resin solution so obtained had a solid content of about 30% and a viscosity of about 550 poises at 25° C.

REFERENTIAL EXAMPLE 4

Synthesis of Acrylic-Polymer-Modified Polyurethane Resin using Amino-Alcohol Compound as Chain Extender

| Formulation | |
|---|---|
| Polycarbonate polyol (hydroxyl value: about 56, molecular weight: about 2,000, bifunctional polyol) | 500 g |
| Terminal OH-containing polymethyl methacrylate (hydroxyl value: about 30, molecular weight: about 3,733, bifunctional polyol) | 500 g |
| Methyldiethanolamine (chain extender) | 5 g |
| IPDI (NCO/OH ≈ 1) | 100.1 g |
| Dibutyltin laurate (catalyst) | 0.1 g |
| MEK (solvent) | 1,129.5 g |
| Toluene (solvent) | 284.4 g |

Synthesis was conducted under the same conditions as in Referential Example 1. The resin solution so obtained had a solid content of about 30% and a viscosity of about 500 poises at 25° C.

REFERENTIAL EXAMPLE 5

Synthesis of Acrylic-Polymer-Modified Polyurethane Resin using a Chain Extender

| Formulation | |
|---|---|
| a) Reaction to obtain an urethane prepolymer: | |
| Polycarbonate polyol (hydroxyl value: about 56, molecular weight: about 2,000, bifunctional polyol) | 1,500 g |
| Terminal OH-containing methyl methacrylate macromonomer (hydroxyl value: about 56, molecular weight: about 2,000, bifunctional polyol) | 500 g |
| Hexamethylene diisocyanate (NCO/OH ≈ 2) | 336 g |
| Zinc octylate (catalyst) | 0.02 g |
| MEK (solvent-1) reaction solvent | 779 g |
| MEK (solvent-2) diluting solvent | 1,557 g |

In a 10-l reactor for a polyurethane resin, the polycarbonate polyol, the terminal OH-containing methyl methacrylate macromonomer and hexamethylene diisocyanate were charged in toto together with 779 g of MEK (solvent-1) and the catalyst, followed by heating from room temperature (about 25° C.) to about 90° C. over one hour. At the temperature so raised, the contents were reacted for about 4 hours, whereby a 75% solution of a terminal NCO-containing urethane prepolymer in MEK was obtained.

To the urethane prepolymer solution so obtained, 1,557 g of MEK were added to give a solid content of 50%. The resulting mixture had an isocyanate content of 1.73%.

| Formulation | |
|---|---|
| b) Chain extending reaction: | |
| The above-described urethane polymer solution having the solid content of 50% | 1,000 g |
| IPDA (chain extender); $NH_2/NCO = 0.8$ | 68.5 g |
| IPA (reaction terminating solvent); $OH/NCO = 0.2$ | 12.0 g |
| MEK (solvent) | 854.5 g |

In another 2-l reactor for a polyurethane resin, the urethane prepolymer solution having the solid content of 50% was charged in toto, followed by the temperature adjustment to about 25°–30° C. In a further vessel, IPDA, IPA and MEK were charged in toto. The temperature of the contents was adjusted to 25°–30° C., followed by agitation into a uniform mixture. While the uniform mixture so obtained was added dropwise to the reactor with the urethane prepolymer solution contained therein, a chain extending reaction was conducted and at the same time, any excess isocyanate groups were masked at a temperature not higher than about 30° C.

The resin solution so obtained had a solid content of about 30% and a viscosity of about 800 poises at 25° C.

In the case of the above-described acrylic-polymer-modified polyurethane resin, there is a limitation on its $NH_2/NCO$ ratio. Namely, when the $NH_2/NCO$ ratio exceeds 0.8, the resin so obtained is soluble neither in MEK or toluene itself nor in any mixture thereof (only soluble in a mixed solvent of MEK, toluene and IPA and in a special solvent such as DMF or DMSO).

IPA is an industrially useful solvent. If an isocyanate compound is finally added as a curing agent to a coating composition with a view toward improving its properties (for example, heat resistance, adhesion), however, a reaction takes place between IPA already contained in the coating composition and the polyisocyanate compound finally added as a curing agent. It is therefore difficult to obtain properties as intended.

In the case of the above acrylic-polymer-modified polyurethane resin, it is preferable to subject about 30–80% of the NCO groups of the prepolymer to chain extension by using a diamine compound.

COMPARATIVE REFERENTIAL EXAMPLE 1

Synthesis of Polyurethane Resin without using any Chain Extender

| Formulation | |
|---|---|
| Polycaprolactone polyol (hydroxyl value: about 56, molecular weight: about 2,000, bifunctional polyol) | 1,000 g |
| MDI (NCO/OH ≈ 1) | 125.0 g |
| Dibutyltin laurate | 0.1 g |
| MEK (solvent) | 2,100 g |
| Toluene (solvent) | 525 g |

In a 10-l reactor for a polyurethane resin, the polycaprolactone polyol was charged in the amount indicated in the above formulation together with 105 g of MDI and 300 g of MEK, followed by heating from room temperature (about 25° C.) to about 90° C. over one hour. At the temperature so raised, the contents were reacted for about one hour. To the reaction mixture, 300 g of MEK and 10.0 g of MDI were added and the reaction was allowed to proceed further for about one hour. To the reaction mixture, the catalyst was added in toto and the remaining MDI in the amount of 10 g was added dropwise. While watching the degree of thickening of the mixture, 300 g of MED were added further. The reaction was then allowed to proceed further for about 2 hours. Toluene was then added in toto together with the remaining MEK to the reaction mixture and the resultant mixture was thereafter allowed to cool down to room temperature, whereby a polyurethane resin solution was obtained. The resin solution so obtained had a solid content of about 30% and a viscosity of about 370 poises at 25° C.

COMPARATIVE EXAMPLE 2

Synthesis of Polyurethane Resin using a Diol Compound as a Chain Extender

| Formulation | |
|---|---|
| Polycarbonate polyol (hydroxyl value: about 56, molecular weight: about 2,000, bifunctional polyol) | 1,000 g |
| 1,3-butanediol (chain extender) | 8 g |
| MDI (NCO/OH ≈ 1) | 147.2 g |
| Dibutyltin laurate (catalyst) | 0.1 g |
| MEK (solvent) | 2,156.0 g |
| Toluene (solvent) | 539.1 g |

Synthesis was conducted under the same conditions as in Comparative Referential Example 1. The resin solution so obtained had a solid content of about 30% and a viscosity of about 550 poises at 25° C.

COMPARATIVE EXAMPLE 3

Synthesis of Polyurethane Resin using a Polyester Polyol

| (Synthesis of polyurethane resin using a polyester polyol) | |
|---|---|
| Neopentyl glycol-ethylene glycol-isophthalate polyol (hydroxyl value: about 56, molecular weight: about 2,000, bifunctional polyol) | 1,000 g |
| MDI (NCO/OH ≈ 1) | 125.0 g |
| Dibutyltin laurate (catalyst) | 0.1 g |
| MEK (solvent) | 2,100 g |
| Toluene (solvent) | 525 g |

Synthesis was conducted under the same conditions as in Comparative Referential Example 1. The resin solution so obtained had a solid content of about 30% and a viscosity of about 660 poises at 25° C.

COMPARATIVE REFERENTIAL EXAMPLE 4

Synthesis of Polyurethane Resin using an Amino Alcohol Compound as a Chain Extender

| Formulation | |
|---|---|
| Polycarbonate polyol (hydroxyl value: about 56, molecular weight: about 2,000, bifunctional polyol) | 1,000 g |
| Methyldiethanolamine (chain extender) | 5 g |
| IPDI (NCO/OH ≈ 1) | 120.3 g |
| Dibutyltin laurate (catalyst) | 0.1 g |
| MEK (solvent) | 2,100.0 g |
| Toluene (solvent) | 525.0 g |

Synthesis was conducted under the same conditions as in Comparative Referential Example 1. The resin solution so obtained had a solid content of about 30% and a viscosity of about 610 poises at 25° C.

COMPARATIVE REFERENTIAL EXAMPLE 5

Synthesis of Polyurethane Urea Resin using a Chain Extender

| Formulation | |
|---|---|
| a) Reaction to obtain urethane prepolymer | |
| Polycarbonate polyol (hydroxyl value: about 56, molecular weight: about 2,000, bifunctional polyol) | 2,000 g |
| Hexamethylene diisocyanate (NCO/OH ≈ 2) | 336 g |
| Zinc octylate (catalyst) | 0.02 g |
| MEK (solvent-1) reaction solvent | 779 g |
| MEK (solvent-2) diluting solvent | 1,557 g |

In a 10-l reactor for a polyurethane resin, the polycarbonate polyol and the hexamethylene diisocyanate were charged in toto together with 779 g of MEK (solvent-1) and the catalyst, followed by heating from room temperature (about 25° C.) to about 90° C. over one hour. At the temperature so raised, the contents were reacted for about four hours, whereby a 75% solution of a terminal NCO-containing urethane prepolymer in MEK was obtained.

To the urethane prepolymer solution, 1,557 g of MEK were added to give a solid content of 50%. The resulting solution had an isocyanate content of about 1.71%.

| b) Chain extending reaction: | |
|---|---|
| The above-described urethane polymer solution having the solid content of 50% | 1,000 g |
| IPDA (chain extender); $NH_2/NCO = 0.8$ | 68.5 g |
| IPA (reaction terminating solvent); OH/NCO = 0.2 | 12.0 g |
| MEK (solvent) | 854.5 g |

In another 2-l reactor for a polyurethane resin, the urethane polymer solution having the solid content of 50% was charged in toto, followed by the temperature adjustment to 25°–30° C. In a further vessel, IPDA, IPA and MEK were charged in toto, followed by the temperature adjustment to 25°–30° C. The contents were then agitated into a uniform mixture. While adding the uniform mixture dropwise to the reactor with the urethane prepolymer solution contained therein, a chain extending reaction was conducted and at the same time, any excess isocyanate groups were masked at a temperature not higher than about 30° C. The resin solution so obtained had a solid content of about 30% and a viscosity of about 870 poises at 25° C.

EXAMPLE 1

Preparation of Coating Composition

| (Preparation of coating composition) | |
|---|---|
| The acrylic-polymer-modified polyurethane resin obtained in Referential Example 1 | 2.0 parts *1 |
| Vinylite VAGH | 8.0 parts *2 |
| Carbon black | 10.0 parts |
| Pigment dispersant | 0.1 part |
| MEK | 40.0 parts |
| Toluene | 40.0 parts |

The above ingredients were kneaded for 3 hours in a paint conditioner, whereby a coating composition according to the present invention was obtained.

To 100 parts of the coating composition so obtained, 3 parts of a curing agent ("Duranate 24A-75", trade name; polyisocyanate compound produced by Asahi Chemical Industry Co., Ltd.) were added to obtain a back coating composition of the present invention. It had a viscosity of about 50 cps at 25° C. The resultant coating composition was coated on a polyester film for video tapes, dried and then allowed to age at 50°–60° C. for 48 hours, whereby a back coat layer of about 1 μm in thickness was formed.

*1: The acrylic-polymer-modified polyurethane resin shown in Referential Example 1

*2: Hydroxyl-containing PVC copolymer resin produced by Union Carbide Corporation.

EXAMPLES 2–5

In a similar manner to Example 1, coating compositions were prepared using the acryl-polymer-modified polyurethane resins shown in Comparative Referential Examples 2–5 and then, back coat layers were formed from them, respectively.

COMPARATIVE EXAMPLES 1–5

Preparation of Coating Compositions as Comparative Examples

In a similar manner to Example 1, coating compositions were prepared using the polyurethane resins shown in Comparative Referential Examples 1–5 and then, back coat layers were formed from them, respectively.

Shown below are evaluation results of the properties of the coating compositions of the present invention (Table 1) and those of Comparative Examples

TABLE 1

| Example | | (1) | (2) | (3) | (4) | (5) |
|---|---|---|---|---|---|---|
| Reflectance (gloss) *1 | 10 min. after curing agent was blended | 92 | 87 | 98 | 98 | 92 |
| | 60 min. after curing agent was blended | 82 | 79 | 85 | 81 | 80 |
| Adhesion to PET film *2 | | B | B | A-B | B | A-B |
| Scratches formed in running test (10 min. after blending of curing agent) *3 | | B | A | A | B | A |

In the above table, (1)–(5) indicate the back coat layers obtained from the coating compositions of Examples 1–5, respectively.

TABLE 2

| Comparative Example | | (1) | (2) | (3) | (4) | (5) |
|---|---|---|---|---|---|---|
| Reflectance (gloss) *1 | 10 min. after curing agent was blended | 62 | 67 | 68 | 63 | 62 |
| | 60 min. after curing agent was blended | 22 | 20 | 35 | 36 | 38 |
| Adhesion to PET film *2 | | C | D | C | C | C |
| Scratches formed in test (10 min. after blending of curing agent) *3 | | C-D | C-D | B-C | B-C | B-C |

In the above table, (1)–(5) indicate the back coat layers obtained from the coating compositions of Comparative Examples 1–5, respectively.

*1: Portions of each coating composition in which "Duranate 24A-75" had been incorporated were coated on polyester films for video tapes respectively, one 10 minutes after the blending and the other after 60 minutes after the blending, followed by drying. After allowing them to age for 48 hours, their gloss values were compared. A smaller gloss value means inferior compatibility between the hydroxyl-containing vinyl chloride copolymer and the polyurethane resin in the coating composition. Further, a smaller gloss value also suggests a rougher surface and inferior abrasion resistance.

*2: Compared according to the peeling test using a cellophane tape.
A: Excellent
B: Good
C: Fair
D: Very poor

*3: From each sample prepared above in *1, a test tape was produced in a form wound on reels. That tape was subjected to a 100-times repeating test on VTR, whereby the condition of scratches on the tape were evaluated.
A: Excellent
B: Good
C: Fair
D: Very poor

What is claimed is:

1. A coating composition for the formation of a back coat layer in a magnetic recording medium, which comprises carbon black, a binder and a solvent, said binder consisting essentially of (a) an acrylic-polymer-modified polyurethane resin and (b) a vinyl chloride copolymer having at least one terminal group selected from the group consisting of hydroxyl groups, carboxyl groups and tertiary amino groups; and wherein said solvent is selected from the group consisting of methyl ethyl ketone, methyl isobutyl ketone, toluene, xylene, ethyl acetate and mixtures thereof; and wherein said polyurethane resin and said vinyl chloride copolymer are used in a weight ratio of about 5/95 to 50/50, respectively, and further wherein said acrylic-polymer-modified polyurethane resin is made using terminal HO-containing macromonomer as at least a part of the hydroxyl component thereof; and wherein said terminal HO-containing bifunctional polyol has a molecular weight of about 400–6,000 and being selected from the group consisting of polyether polyols, lactone polyols and polyester polyols.

2. The coating composition of claim 1, wherein said polyether polyols are selected from the group consisting of polyethylene glycol, polyoxypropylene glycol, polytetramethylene glycol and EO/PO copolymers.

3. The coating composition of claim 1, wherein said lactone polyols are selected from the group consisting of valerolactone polyol and polycaprolactone polyol.

4. The coating composition of claim 1, wherein said polyester polyols are selected from the group consisting of polyester polyols obtained from diols and dibasic acids.

5. The coating composition of claim 1, wherein said acrylic-polymer-modified polyurethane resin (a) and said vinyl chloride copolymer (b) are used in a ratio (a)/(b) of from 5/95 to 50/50.

6. The coating composition of claim 1, wherein a weight ratio of binder to carbon black of from 60/40 to 40/60, respectively, is used.

* * * * *